(12) United States Patent
Nagai et al.

(10) Patent No.: US 8,377,834 B2
(45) Date of Patent: Feb. 19, 2013

(54) GLASS COMPOSITION FOR SUBSTRATES AND PROCESS FOR ITS PRODUCTION

(75) Inventors: Kensuke Nagai, Tokyo (JP); Tetsuya Nakashima, Tokyo (JP); Kei Maeda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 368 days.

(21) Appl. No.: 12/699,944

(22) Filed: Feb. 4, 2010

(65) Prior Publication Data

US 2010/0137122 A1    Jun. 3, 2010

Related U.S. Application Data

(63) Continuation of application No. PCT/JP2008/069157, filed on Oct. 22, 2008.

(30) Foreign Application Priority Data

Oct. 25, 2007 (JP) ................................. 2007-277126

(51) Int. Cl.
*C03C 3/087* (2006.01)
(52) U.S. Cl. ........................................ 501/70; 65/134.3
(58) Field of Classification Search .................... 501/70; 65/134.3
See application file for complete search history.

(56) References Cited

U.S. PATENT DOCUMENTS

| | | | |
|---|---|---|---|
| 4,792,536 A | 12/1988 | Pecoraro et al. | |
| 5,599,754 A | 2/1997 | Maeda et al. | |
| 6,054,401 A * | 4/2000 | Sugiura et al. | 501/70 |
| 6,063,718 A * | 5/2000 | El Khiati et al. | 501/70 |
| 6,297,182 B1 | 10/2001 | Maeda et al. | |
| 6,949,485 B2 * | 9/2005 | Nakashima et al. | 501/69 |
| 7,309,671 B2 * | 12/2007 | Kurachi et al. | 501/70 |
| 8,071,494 B2 * | 12/2011 | Nagai et al. | 501/69 |
| 2003/0220183 A1 | 11/2003 | Kurachi et al. | |
| 2005/0003136 A1 | 1/2005 | Kurachi et al. | |
| 2007/0179039 A1 | 8/2007 | El Khiati et al. | |
| 2009/0239035 A1 | 9/2009 | Nagai et al. | |
| 2009/0239102 A1 | 9/2009 | Nagashima et al. | |
| 2009/0253567 A1 * | 10/2009 | Nagai et al. | 501/70 |
| 2010/0210443 A1 * | 8/2010 | Nagai et al. | 501/70 |

FOREIGN PATENT DOCUMENTS

| | | |
|---|---|---|
| EP | 297 404 | 1/1989 |
| EP | 0 592 237 A1 | 4/1994 |
| EP | 0 795 522 A1 | 9/1997 |
| GB | 2 317 611 A | 4/1998 |
| JP | 64-18938 | 1/1989 |
| JP | 08-165138 | 6/1996 |
| JP | 11-322358 | 11/1999 |
| JP | 2003-335547 | 11/2003 |
| JP | 2005-15328 | 1/2005 |
| KR | 10-2006-0102332 | 9/2006 |

OTHER PUBLICATIONS

Machine Translation of JP 11-322358 A1, Nov. 24, 1999.*
Extended European Search Report issued Oct. 14, 2010 in Patent Application No. 08842802.4.
Office Action issued Feb. 8, 2012, in Korean Patent Application No. 10-2010-7006225 with English translation.
U.S. Appl. No. 12/769,703, filed Apr. 29, 2010, Nagai, et al.
U.S. Appl. No. 13/163,820, filed Jun. 20, 2011, Nagai, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

A glass composition for substrates excellent in productivity is provided by lowering the high temperature viscosity while securing characteristics and quality required for FPD substrates, particularly for PDP substrates. A glass composition for substrates, which is characterized by comprising, as represented by mass% based on oxides, from 55 to 75% of $SiO_2$, from 5 to 15% of $Al_2O_3$, from 4 to 18% of MgO, from 3 to 12% of CaO, from 4 to 18% of SrO, from 0 to 20% of BaO, from 6 to 20% of $Na_2O+K_2O$, from 0.5 to 6% of $ZrO_2$ and from 18 to 25% of MgO+CaO+SrO+BaO, as a glass matrix composition, and containing from 0.001 to 0.6% of $SO_3$, and which is further characterized in that when the viscosity is represented by $\eta$, the temperature satisfying $\log\eta=2$ is at most 1,545° C. and the devitrification temperature is at most the temperature satisfying $\log\eta=4$, the thermal expansion coefficient is from $75\times10^{-7}$ to $90\times10^{-7}$/° C., the specific gravity is at most 2.8, and the glass transition point is at least 600° C.

9 Claims, No Drawings

US 8,377,834 B2

GLASS COMPOSITION FOR SUBSTRATES AND PROCESS FOR ITS PRODUCTION

CROSS-REFERENCE TO RELATED APPLICATIONS

This application is a continuation of PCT/JP2008/069157 filed Oct. 22, 2008. This application is based upon and claims the benefit of priority to Japanese Patent Application No. 2007-277126 filed on Oct. 25, 2007, the entire contents of which are incorporated herein by reference.

BACKGROUND OF THE INVENTION

TECHNICAL FIELD

The present invention relates to a glass composition for substrates, which is suitable for the production of a large plate by a float process and which is useful for flat panel display (hereinafter referred to as FPD) substrates or solar cell substrates, particularly for plasma display panel (hereinafter referred to as PDP) substrates, and a process for its production.

BACKGROUND ART

PDP is usually prepared by baking metal electrodes, an insulating paste, a rib paste, etc. on a substrate glass at a temperature of from about 550 to 600° C., followed by frit-sealing the periphery together with a facing plate. As a substrate glass for PDP, it has been common to employ soda lime silica glass which is widely used in the field of buildings or automobiles.

However, the glass transition point of such soda lime silica glass is from 530 to 560° C. Therefore, if subjected to heat treatment at the above baking temperature, the substrate glass undergoes deformation or shrinkage and thus undergoes a substantial dimensional change, whereby it has been difficult to precisely align the electrode positions with the facing plate.

In order to solve such a problem of thermal deformation or thermal shrinkage of the substrate glass, a glass composition for substrates has been known which has a thermal expansion coefficient close to soda lime silica glass and which has a high glass transition point and a high strain point (Patent Document 1).

However, with the glass composition for substrates as disclosed in Patent Document 1, the viscosity of the glass at a high temperature is high as compared with soda lime silica glass. Therefore, the temperature of each step (such as a melting step, a fining step or a forming step) carried out at the time of producing the substrate glass, i.e. the glass melting temperature, fining temperature or forming temperature must be made high, thus leading to such problems that stabilized production tends to be difficult, the useful life of the production equipments is adversely affected, and the production cost for the substrate glass tends to be high.

Accordingly, it has been desired to lower the high temperature viscosity of glass in order to improve the productivity of glass such as stabilized production of glass or prolonging the useful life of the production equipments or to reduce the production cost.

However, if the glass composition is changed merely to lower the high temperature viscosity, it is not possible to satisfy the characteristics required for the substrate glass for PDP. That is, it is not possible to bring the characteristics such as the specific gravity, glass transition point, chemical resistance, dielectric constant, volume resistivity, refractive index, thermal expansion coefficient, strain point, strength (such as fracture toughness), scratch resistance (such as crack initiation load), etc. of the glass composition for substrates within the respective ranges to be satisfied for the substrate of glass for PDP.

Further, if the temperature in the fining step is lowered by lowering the high temperature viscosity of the glass composition, the effects of the fining agent will be low, which adversely affects bubble quality as a FPD substrate glass, particularly as a PDP substrate glass. At the time of producing a glass composition for substrates, $SO_3$ is usually used as a fining agent in order to reduce bubbles (gas bubbles) in the glass. $SO_3$ is added in the form of a sulfate of an alkaline earth metal to the glass raw material. Subsequently, $SO_3$ is decomposed in the molten glass to generate $SO_2$ gas. When this $SO_2$ gas is present in the molten glass, it rises together with gas bubbles, thereby to promote the fining action. However, if the temperature in the fining step is lowered by lowering the high temperature viscosity of the glass composition, decomposition of $SO_3$ in the molten glass tends to hardly take place, whereby the effects of the fining agent will decrease.

Patent Document 1: JP-A-8-165138

DISCLOSURE OF THE INVENTION

Object to be Accomplished by the Invention

In order to solve the above-mentioned problems, it is an object of the present invention to provide a glass composition for substrates which is excellent in productivity, by lowering the high temperature viscosity, while securing the characteristics and quality as FPD substrates or solar cell substrates, particularly as PDP substrates, and a process for such a glass composition.

BRIEF SUMMARY OF THE INVENTION

In order to accomplish the above object, the present invention provides a glass composition for substrates, which is characterized by comprising, as represented by mass % based on oxides, from 55 to 75% of $SiO_2$, from 5 to 15% of $Al_2O_3$, from 4 to 18% of MgO, from 3 to 12% of CaO, from 4 to 18% of SrO, from 0 to 20% of BaO, from 6 to 20% of $Na_2O+K_2O$, from 0.5 to 6% of $ZrO_2$ and from 18 to 25% of MgO+CaO+SrO+BaO, as a glass matrix composition, and containing from 0.001 to 0.6% of $SO_3$, and which is further characterized in that when the viscosity is represented by η, the temperature satisfying logη=2 is at most 1,545° C. and the devitrification temperature is at most the temperature satisfying logη=4, the thermal expansion coefficient is from $75 \times 10^{-7}$ to $90 \times 10^{-7}$/° C., the specific gravity is at most 2.8, and the glass transition point is at least 600° C.

The glass composition for substrates of the present invention preferably comprises, as represented by mass% based on oxides, from 55 to 70% of $SiO_2$, from 5 to 10% of $Al_2O_3$, from 4 to 10% of MgO, from 3 to 8% of CaO, from 4 to 13% of SrO, from 0 to 11% of BaO, from 6 to 15% of $Na_2O+K_2O$, from 0.5 to 4% of $ZrO_2$ and from 18 to 25% of MgO+CaO+SrO+BaO, as a glass matrix composition, and contains from 0.01 to 0.4% of $SO_3$.

The glass composition for substrates of the present invention is preferably such that the difference between the $SO_3$ content in a glass obtained by adding to the glass matrix composition material a sulfate in an amount of from 0.5 to 10 mass% as calculated as $SO_3$ to prepare a glass material, melting and holding the glass material at 1,350° C. for from 30 minutes to 2 hours and then cooling it to from 20 to 30° C. in from 30 seconds to 1 minute, and the $SO_3$ content in a glass obtained by melting and holding the glass material at 1,500° C. for from 30 minutes to 2 hours and then cooling it to from 20 to 30° C. in from 30 seconds to 1 minute, is at least 0.17.

Further, the glass composition for substrates of the present invention preferably has a fracture roughness of at least 0.7 $MPa·m^{1/2}$.

Further, the glass composition for substrates of the present invention preferably has a volume resistivity of at least $10^{11}$ $\Omega·cm$ at 150° C.

DETAILED DESCRIPTION OF THE INVENTION

Further, the present invention provides a process for producing a glass composition for substrates, which comprises preparing a material so as to obtain a glass comprising, as represented by mass % based on oxides, from 55 to 75% of $SiO_2$, from 5 to 15% of $Al_2O_3$, from 4 to 18% of MgO, from 3 to 12% of CaO, from 4 to 18% of SrO, from 0 to 20% of BaO, from 6 to 20% of $Na_2O+K_2O$, from 0.5 to 6% of $ZrO_2$ and from 18 to 25% of MgO+CaO+SrO+BaO, as a glass matrix composition, adding to the material a sulfate in an amount of from 0.5 to 10 mass% as calculated as $SO_3$ to prepare a glass material, melting the glass material at from 1,200 to 1,400° C., then fining it at from 1,400 to 1,700° C., and forming it into a plate glass by a float process to obtain the glass composition for substrates as defined in [0010].

Further, the present invention provides a process for producing a glass composition for substrates, which comprises preparing a material so as to obtain a glass comprising, as represented by mass % based on oxides, from 55 to 70% of $SiO_2$, from 5 to 10% of $Al_2O_3$, from 4 to 10% of MgO, from 3 to 8% of CaO, from 4 to 13% of SrO, from 0 to 11% of BaO, from 6 to 15% of $Na_2O+K_2O$, from 0.5 to 4% of $ZrO_2$ and from 18 to 25% of MgO+CaO+SrO+BaO, as a glass matrix composition, adding to the material a sulfate in an amount of from 0.5 to 10 mass % as calculated as $SO_3$ to prepare a glass material, melting the glass material at from 1,200 to 1,400° C., then fining it at from 1,400 to 1,700° C., and forming it into a plate glass by a float process to obtain the glass composition for substrates as defined in [0011].

Effects of the Invention

The glass composition for substrates of the present invention is characterized by the high temperature viscosity being low while securing characteristics as FPD substrates or solar cell substrates, particularly as PDP substrates. It is thereby possible to lower the temperatures of the respective steps carried out for the production of the glass composition for substrates, i.e. the temperatures in the melting step, the fining step and the forming step (such as a forming step by a float process). Lowering of the temperatures in the respective steps carried out for the production of the glass composition for substrates brings about merits such that the productivity will be improved, the production will be easy, the production will be stabilized, the useful life of the production equipments will be prolonged, and the production cost of the glass composition for substrates will be low.

Further, the glass composition for substrates of the present invention is excellent in fining properties i.e. the clarification initiating temperature is low, whereby even when the temperature in the fining step is lowered, the effects of the fining agent will be suitably provided. As a result, it is possible to obtain a substrate glass of high quality with few bubbles.

Further, the temperature (the temperature at which the viscosity $\eta$ satisfies $\log\eta=2$) as an index for float forming becomes low, whereby it is possible to reduce tin defects of the obtainable glass composition for substrates. If the temperature in the forming step by a float process is high, the amount of evaporation of molten tin in the float bath will increase. The evaporated tin is likely to be condensed in the vicinity of the ceiling of the float bath and fall on the glass ribbon to form tin defects.

Further, the glass composition for substrates of the present invention is superior to conventional glass to be used for PDP substrates in the following respects:

It has a low specific gravity.
It is excellent in devitrification property.
It has a high strength (high fracture toughness).
It is excellent in scratch resistance.

BEST MODE FOR CARRYING OUT THE INVENTION

Now, the glass composition for substrates of the present invention will be further described.

The glass composition for substrates of the present invention comprises, as represented by mass % based on oxides, from 55 to 75% of $SiO_2$, from 5 to 15% of $Al_2O_3$, from 4 to 18% of MgO, from 3 to 12% of CaO, from 4 to 18% of SrO, from 0 to 20% of BaO, from 6 to 20% of $Na_2O+K_2O$, from 0.5 to 6% of $ZrO_2$ and from 18 to 25% of MgO+CaO+SrO+BaO, as a glass matrix composition, and contains from 0.001 to 0.6% of $SO_3$.

The glass composition for substrates of the present invention is defined to have the above composition for the following reasons.

In the following, mass % will simply be represented by % unless otherwise specified.

$SiO_2$ is a component to form the network of the glass, and if it is less than 55%, the heat resistance of the glass tends to be poor. If it exceeds 75%, the thermal expansion coefficient tends to be low, and the high temperature viscosity of the glass tends to increase, whereby the melting property is likely to be poor.

The content of $SiO_2$ is preferably from 55 to 72%, more preferably from 55 to 70%, further preferably from 55 to 68%.

$Al_2O_3$ has an effect to increase the glass transition point and to improve the heat resistance, but if it is less than 5%, such an effect is little. On the other hand, if it exceeds 15%, the high temperature viscosity of the glass tends to increase, whereby the melting property tends to be low.

The content of $Al_2O_3$ is preferably from 5 to 12%, more preferably from 5 to 10%, further preferably from 5 to 8%.

MgO has a function to lower the viscosity at the time of melting the glass and to promote the melting and has an effect to increase the fracture toughness and to lower the specific gravity, but if it is less than 4%, such effects are little. On the other hand, if it exceeds 18%, the thermal expansion coefficient of the glass tends to be too large, and the devitrification temperature tends to be high, and the glass tends to be unstable.

The content of MgO is preferably from 4 to 15%, more preferably from 4 to 10%.

CaO has an effect to improve the glass transition point of the glass and to increase the thermal expansion coefficient and an effect to lower the high temperature viscosity of the glass and to reduce the specific gravity. If its content is less than 3%, the thermal expansion coefficient of the glass tends to be too small. On the other hand, if it exceeds 12%, the thermal expansion coefficient tends to be too large, and the devitrification temperature tends to be too high.

The content of CaO is preferably from 3 to 10%, more preferably from 3 to 8%, further preferably from 3.1 to 8%, particularly preferably from 3.2 to 6%.

SrO has an effect to improve the transition point of the glass and to increase the thermal expansion coefficient in the same manner as CaO and has an effect to increase the electrical resistance. If its content is less than 4%, the glass transition point tends to be too low. On the other hand, if it exceeds 18%, the thermal expansion coefficient of the glass tends to be too large, and the specific gravity tends to be too large.

The content of SrO is preferably from 4 to 15%, more preferably from 4 to 13%, further preferably from 4 to 10%, particularly preferably from 4 to 8%.

BaO has an effect to improve the glass transition point of the glass and to increase the thermal expansion coefficient in the same manner as CaO or SrO, and an effect to lower the high temperature viscosity of the glass, and it may be incorporated. However, if its content exceeds 20%, the thermal expansion coefficient of the glass tends to be too large, and the specific gravity tends to be too large, and therefore it is at most 20%.

The content of BaO is preferably at most 18%, more preferably at most 16%, further preferably at most 14%, particularly preferably at most 11%, still further preferably at most 9%.

However, in consideration of the environmental burden, BaO is preferably not substantially incorporated.

If the total amount of MgO+CaO+SrO+BaO is less than 18%, the high temperature viscosity of the glass tends to be too high, and the glass transition point tends to be too low. On the other hand, if the total amount exceeds 25%, the specific gravity tends to be too large.

Their total amount is preferably from 19 to 25%.

At least one of $Na_2O$ and $K_2O$ is essential to make the thermal expansion coefficient of the glass large. If their total amount is less than 6%, the thermal expansion coefficient of the glass tends to be too small. On the other hand, if their total amount exceeds 20%, the heat resistance of the glass tends to be low.

Their total amount is preferably from 6 to 18%, more preferably from 6 to 15%, further preferably from 6 to 13%.

Between them, $K_2O$ tends to more increase the thermal expansion coefficient of the glass and is preferably contained in an amount of at least 1%. On the other hand, if these components are incorporated excessively, deterioration of the heat resistance of the glass tends to increase. From such a viewpoint, it is more preferred that $Na_2O$ is within a range of from 0 to 10%, and $K_2O$ is within a range of from 1 to 10%.

On the other hand, $Li_2O$ deteriorates the heat resistance of the glass and should not substantially be contained other than as an unavoidable impurity.

$ZrO_2$ is used to improve the heat resistance and chemical durability of the glass, but if it is less than 0.5%, its effects are little. On the other hand, if its content exceeds 6%, the devitrification temperature of the glass tends to be too high, and the thermal expansion coefficient tends to be too low.

The content of $ZrO_2$ is preferably from 0.5 to 4.5%, more preferably from 0.5 to 4%, further preferably from 0.5 to 3.5%, particularly preferably from 0.5 to 3%.

Further, in order to improve the melting property, $B_2O_3$ may be incorporated. However, if it is excessively incorporated, the thermal expansion coefficient of the substrate glass tends to be too low, and therefore, it is preferably less than 1.5%. However, for the glass composition for substrates of the present invention, it is preferred that $B_2O_3$ is not substantially incorporated.

At the time of producing the glass composition for substrates of the present invention, $SO_3$ is added as a fining agent. As a $SO_3$ source, a sulfate such as potassium sulfate ($K_2SO_4$), sodium sulfate ($Na_2SO_4$) or calcium sulfate ($CaSO_4$) is put into the glass raw material, and in the glass composition for substrates after the production, a part of $SO_3$ added as a fining agent will remain. If such a fining agent is put into the glass material in such an amount that the residual amount in the glass composition for substrates after the production would exceed 0.6%, glass undergoes reboiling during the production, whereby gas bubbles will remain in the glass.

Further, when $SO_3$ is used as a fining agent, if the amount of its addition (the amount of addition to the glass matrix composition raw material, the same applies hereinafter) exceeds 10%, it will be separated from the glass melt during the melting and will remain as dissolved. On the other hand, if it is less than 0.5%, the fining effect tends to be poor. Therefore, it is added in an amount of from 0.5 to 10%, preferably from 0.5 to 8%, more preferably from 0.5 to 4%, further preferably from 0.7 to 2%.

In such a case, the residual amount in the glass composition for substrates will be from 0.001 to 0.6%, preferably from 0.002 to 0.5%, more preferably from 0.005 to 0.4%, further preferably from 0.01 to 0.4%, as calculated as $SO_3$.

The glass composition for substrates of the present invention is excellent in the fining effect by $SO_3$ added as a fining agent at the time of its production, i.e. the effect to remove gas bubbles from the glass melt.

$SO_3$ added as a fining agent will be decomposed in the glass melt, and $SO_2$ thereby generated will be gas bubbles and will rise together with bubbles in the glass melt thereby to exhibit the fining effect. Accordingly, the larger the amount of $SO_3$ to be reduced from the glass melt by such decomposition of $SO_3$ in the fining step, the higher the fining effect.

The glass composition for substrates of the present invention is preferably such that the difference (hereinafter referred to as $\Delta SO_3$) between the $SO_3$ content ($SO_3$ (1,350° C.)) (%) in a glass obtained by adding to 100 mass % of the glass matrix composition material a sulfate in an amount of from 0.5 to 10 mass % as calculated as $SO_3$ to prepare a glass material, melting and holding the glass material at 1,350° C. for from 30 minutes to 2 hours and then cooling it with water to from 20 to 30° C. in from 30 seconds to 1 minute, and the $SO_3$ content ($SO_3$ (1,500° C.)) (%) in a glass obtained by melting and holding the glass material at 1,500° C. for from 30 minutes to 2 hours, and then, cooling it with water to from 20 to 30° C. for from 30 seconds to 1 minute, is at least 0.17. Here, 1,350° C. is a typical temperature of a glass melt in the melting step which is carried out during the production of the glass, and 1,500° C. is a typical temperature of the glass melt in the fining step.

Here, the $SO_3$ content is not one in the glass melt, but is a $SO_3$ content in a glass obtained by melting and holding the glass material at 1,350° C. or 1,500° C. and then cooling it with water to from 20 to 30° C. in from 30 seconds to 1 minute, because it is not possible to measure the $SO_3$ content in the glass melt. Further, by maintaining the glass melt at 1,350° C. or 1,500° C. for at least 30 minutes, the $SO_3$ content in the glass melt can be made substantially constant. When it is cooled with water to from 20 to 30° C. in such a short time as from 30 seconds to 1 minute, a change in the $SO_3$ content during the cooling may be negligible.

When $\Delta SO_3$ is within the above range, such a glass is regarded as a glass excellent in the fining effect, since among $SO_3$ added as a fining agent, the amount which is reduced from the glass melt by decomposition in the fining step is substantial.

ΔSO$_3$ is more preferably at least 0.18%, further preferably at least 0.19%. on the other hand, ΔSO$_3$ is preferably at most 1.5%.

Accordingly, one preferred embodiment of the glass composition in the present invention comprises, as represented by mass% based on oxides, from 55 to 70% of SiO$_2$, from 5 to 10% of Al$_2$O$_3$, from 4 to 10% of MgO, from 3 to 8% of CaO, from 4 to 13% of SrO, from 0 to 11% of BaO, from 6 to 15% of Na$_2$O+K$_2$O, from 0.5 to 4% of ZrO$_2$ and from 18 to 25% of MgO+CaO+SrO+BaO, as a glass matrix composition, and contains from 0.01 to 0.4% of SO$_3$.

Further, a more preferred glass composition in the present invention comprises SiO$_2$, Al$_2$O$_3$, MgO, CaO, SrO, Na$_2$O, K$_2$O and ZrO$_2$.

To the glass composition for substrates of the present invention, in addition to the above components, SnO$_2$, As$_2$O$_3$, Sb$_2$O$_3$, P$_2$O$_5$, F and Cl may be incorporated in a total amount of at most 2%, preferably at most 1.5%, based on the glass matrix composition material, in order to improve the melting property, clarification property or moldability of the glass.

Further, in order to improve the durability of the glass composition for substrates, La$_2$O$_3$, TiO$_2$, SnO$_2$ and ZnO may be incorporated in a total amount of at most 5%, based on the glass matrix composition material.

Further, in order to adjust the color of the glass composition for substrates, coloring agents such as Fe$_2$O$_3$, CoO, NiO, Nd$_2$O$_3$, etc. may be incorporated. Such coloring agents may be incorporated in a total amount of at most 3%, preferably at most 1%, based on the glass matrix composition material.

The glass composition for substrates of the present invention is characterized in that its high temperature viscosity is low as compared with conventional PDP substrate glass. Specifically, the temperature T$_2$ of the glass melt corresponding to the viscosity of 10$^2$ dPa·s is at most 1,545° C. The viscosity of 10$^2$ dPa·s is a reference viscosity showing that the viscosity of the glass melt is sufficiently low. Accordingly, the temperature T$_2$ at which the viscosity of the glass melt becomes 10$^2$ dPa·s is a reference temperature for the glass melt.

In the case of conventional PDP substrate glass, T$_2$ mostly exceeded 1,545° C. In the case of the glass composition for substrates of the present invention, T$_2$ is at most 1,545° C., whereby the melting step can be carried out at a temperature lower than ever before. As a result, stabilized production of glass becomes possible. Further, the useful life of the melting tank will be prolonged as the temperature of the melting tank during the melting step becomes low. The glass production cost will decrease as the amount of fuel to be used for the melting step will be reduced.

T$_2$ is preferably at most 1,543° C., more preferably at most 1,540° C., further preferably at most 1,510° C., particularly preferably at most 1,500° C. On the other hand, T$_2$ is preferably at least 1,400° C. with a view to securing the melting property.

The glass composition for substrates of the present invention is preferably such that that the temperature T$_4$ of the glass melt corresponding to a viscosity of 10$^4$ dPa·s is at most 1,200° C.

The viscosity of 10$^4$ dPa·s is a reference viscosity for float forming of the glass. Accordingly, the temperature 1$_4$ at which the viscosity of the glass melt becomes 10$^4$ dPa·s is also a reference temperature of the glass melt in the float forming step.

In the case of conventional PDP substrate glass, T$_4$ exceeded 1,200° C. In the case of the glass composition for substrates of the present invention, T$_4$ is at most 1,200° C., whereby the float forming step can be carried out at a temperature lower than ever before. As a result, stabilized production of glass becomes possible. Further, the useful life of the float bath will be prolonged. Further, the production cost of substrate glass decreases as the fuel required for heating the float bath is reduced. Further, the temperature of the glass ribbon withdrawn from the float bath will be low, whereby an energy required for the annealing step which is carried out subsequent to the float forming, will be reduced.

Further, by lowering the temperature in the float forming step, it is possible to reduce tin defects of the obtainable glass. If the temperature in the float forming step is high, the temperature in the float bath, particularly the temperature of the molten tin, becomes high, whereby the amount of evaporation of the molten tin increases. The evaporated tin will be condensed in the vicinity of the ceiling of the float bath and will fall on the glass ribbon to form tin defects.

By lowering the temperature in the float forming step, the temperature in the float bath, particularly the temperature of the molten tin, can be lowered. As a result, the amount of evaporation of molten tin will be reduced, and tin defects of the glass caused by the evaporated molten tin will be reduced.

T$_4$ is preferably at most 1,180° C., more preferably at most 1,160° C., further preferably at most 1,150° C. On the other hand, T$_4$ is preferably at least 1,000° C. with a view to securing the formability.

The glass composition for substrates of the present invention preferably has a devitrification temperature of at most T$_4$, more preferably lower than T$_4$. As mentioned above, T$_4$ is also a reference temperature of a glass melt in a float forming step. The devitrification being lower than T$_4$ is suitable for forming by a float process. Further, the glass composition for substrates of the present invention more preferably has a devitrification temperature which is lower by at least 1° C., particularly preferably lower by at least 5° C., most preferably lower by at least 10° C., than 1$_4$.

The glass composition for substrates of the present invention preferably has a thermal expansion coefficient within a range of from 75×10$^{-7}$ to 90×10$^{-7}$/° C. In a case where the glass composition for substrates of the present invention is used for PDP substrates, it is necessary to use one which agrees with the thermal expansion coefficient of the glass, as a frit material or a paste material to be used for the production of PDP. In the temperature range (from 50 to 350° C.) in the baking step carried out for the production of PDP, it is very difficult to select one, of which the thermal expansion coefficient is outside the above-mentioned range.

The glass composition for substrates of the present invention more preferably has a thermal expansion coefficient a within a range of from 80×10$^{-7}$ to 90×10$^{7-}$/° C.

The glass composition for substrates of the present invention preferably has a specific gravity of at most 2.8. If the specific gravity exceeds 2.8, the glass composition for the substrates becomes heavy, such being undesirable from the viewpoint of the handling, particularly the transportation. The specific gravity of the glass composition for substrates being at most 2.8 is a particularly important characteristic for a large size substrate.

The glass composition for substrates of the present invention preferably has a specific gravity of at most 2.77, more preferably at most 2.75.

The glass composition for substrates of the present invention preferably has a glass transition point (Tg) of at least 600° C. If the glass transition point is lower than 600° C., shrinkage of the glass by thermal treatment cannot sufficiently be made small in a case where a large size PDP so-called 40 inches is to be produced.

The glass composition for substrates of the present invention more preferably has a Tg of at least 610° C., further preferably at least 615° C.

The glass composition for substrates of the present invention preferably has high strength. Specifically, its fracture toughness is preferably at least 0.7 MPa·m$^{1/2}$. When the fracture toughness is at least 0.7 MPa·m$^{1/2}$, chipping or cracking of the glass substrate is less likely to occur during the production or use of PDP. The fracture toughness is more preferably at least 0.71 MPa·m$^{1/2}$, further preferably at least 0.72 MPa·m$^{1/2}$.

The glass composition for substrates of the present invention preferably has a volume resistivity of at least $10^{11}$ Ω·cm at 150° C. At the time of producing PDP, silver electrodes are formed on the surface of a substrate glass. When an electric current is conducted to the silver electrodes, in order to prevent a part of the conducted electric current from flowing in the glass in the vicinity of the silver electrodes, it is preferred that the glass composition for substrates is excellent in the insulating property. When the volume resistivity is at least $10^{11}$ Ω·cm at 150° C., the insulating property is excellent, and even when PDP is large sized or highly densified, there will be no such a possibility that when an electric current is conducted to silver electrodes formed on the substrate glass, a part of the conducted electric current will flow in the glass in the vicinity of the silver electrodes.

Usually if the composition of the glass composition for substrates is selected by paying attention only to lower the high temperature viscosity, it is difficult to bring the volume resistivity at 150° C. to a level of at least $10^{11}$ Ω·cm. In the case of the glass composition for substrates of the present invention, it is possible to lower the high temperature viscosity of the glass while maintaining the volume resistivity of the glass at 150° C. at a level of at least $10^{11}$ Ω·cm.

With the substrate glass of the present invention, the volume resistivity of the glass at 150° C. is preferably at least $2 \times 10^{11}$ Ω·cm, more preferably at least $5 \times 10^{11}$ Ω·cm.

The glass composition for substrates of the present invention is useful for FPD substrates or solar cell substrates, particularly for PDP substrates.

Its spectral transmittance is preferably at least 85% in each range of from 425 to 475 nm, from 510 to 560 nm or from 600 to 650 nm.

When used as a PDP substrate, its thickness is preferably from 0.3 mm to 3.0 mm.

The glass of the present invention (the glass composition for substrates) may be produced, for example, by the following process. That is, materials of the respective components which are commonly used, are mixed to have a desired composition; this mixture is continuously introduced into a melting furnace, heated and melted at from 1,200 to 1,400° C. and clarified at from 1,400 to 1,700° C.; then, this molten glass is formed into a predetermined thickness by a float process, followed by annealing and then by cutting to obtain a transparent glass substrate.

EXAMPLES

Now, the present invention will be described with reference to Examples, but it should be understood that the present invention is by no means restricted to such Examples.

Table 1 shows the glass compositions in Examples 1 to 4 (Working Examples of the present invention) and Examples 5 to 7 (Comparative Examples).

A material for the matrix composition (SiO$_2$ to Zr$_2$O) is prepared to have a desired composition; to the material, sodium sulfate was added in an amount of 0.8% as calculated as SO$_3$ to prepare a glass material; and the glass material was heated and melted at a temperature of from 1,500 to 1,600° C. for 4 hours by using a platinum crucible. For the melting, a platinum stirrer was inserted, and stirring was carried out for 2 hours to homogenize the glass. Then, the glass melt was cast and annealed, followed by polishing to obtain a plate having a thickness of 2.8 mm.

With respect to the glass thus obtained, the glass composition (unit: mass %), the thermal expansion coefficient from 50 to 350° C. ($\alpha_{50-350}$, unit: $10^{-7}/°$ C.), the glass transition point (Tg, unit: ° C.), the volume resistivity at 150° C. (logρ, unit: Ωcm), the specific gravity, the fracture toughness (unit: MPa·m$^{1/2}$), T$_2$ (unit: ° C.), T$_4$ (unit: ° C.) and the devitrification temperature (unit: ° C.) were measured. The results are shown in Table 1. In the Table, numerals in brackets ( ) are calculated values.

The glass transition point was measured as follows. The glass was maintained at a temperature of annealing point for 30 minutes and then annealed at a cooling rate of 60° C/min. Then, with respect to this annealed glass, a thermal expansion coefficient curve to a temperature of from room temperature to the deformation point was obtained by using a differential thermal dilatometer. Before and after the first bent portion of this curve, tangent lines were drawn, and the temperature corresponding to the intersection of the tangent lines was taken as a glass transition point.

Further, SO$_3$ (1,350° C.) and SO$_3$ (1,500° C.) were measured by the following procedure.

A material for a matrix composition (SiO$_2$ to Zr$_2$O) was prepared to have a desired composition; to the material, a sulfate was added in an amount of 0.8% as calculated as SO$_3$ to prepare a glass material; by using a platinum crucible, the glass material was melted at 1,350° C. or 1,500° C., maintained for 30 minutes and then cooled with water to from 20 to 30° C. in from 30 seconds to 1 minute to prepare a glass sample; and SO$_3$ (1,350° C.) or SO$_3$ (1,500° C.) was measured by FP method (fundamental parameter quantitative method).

TABLE 1

|  | Example 1 | Example 2 | Example 3 | Example 4 | Example 5 | Example 6 | Example 7 |
| --- | --- | --- | --- | --- | --- | --- | --- |
| SiO$_2$ | 65.4 | 57.5 | 58.0 | 57.3 | 56.2 | 59.5 | 62.2 |
| Al$_2$O$_3$ | 5.0 | 7.4 | 7.5 | 7.4 | 14.1 | 7.1 | 9.6 |
| MgO | 7.2 | 4.5 | 4.5 | 5.7 | 6.0 | 3.2 | 4.6 |
| CaO | 3.0 | 4.3 | 5.1 | 3.3 | 6.0 | 5.2 | 6.4 |
| SrO | 9.0 | 13.1 | 11.6 | 8.2 | 0.0 | 7.2 | 2.8 |
| BaO | 0.0 | 1.0 | 1.0 | 7.8 | 5.7 | 3.6 | 0.0 |
| Na$_2$O | 6.4 | 4.9 | 4.9 | 4.8 | 8.0 | 3.5 | 5.3 |
| K$_2$O | 3.5 | 4.5 | 4.5 | 4.5 | 3.0 | 7.6 | 7.4 |
| ZrO$_2$ | 0.5 | 2.8 | 2.9 | 1.0 | 1.0 | 3.1 | 1.7 |
| Na$_2$O + K$_2$O | 9.9 | 9.4 | 9.4 | 9.3 | 11.0 | 11.1 | 12.7 |
| MgO + CaO + SrO + BaO | 19.2 | 22.9 | 22.2 | 25.0 | 17.7 | 19.2 | 13.8 |

TABLE 1-continued

|  | Example 1 | Example 2 | Example 3 | Example 4 | Example 5 | Example 6 | Example 7 |
|---|---|---|---|---|---|---|---|
| Amount of $SO_3$ added | 0.8 | 0.8 | 0.8 | 0.8 | 0.8 | 0.8 | 0.8 |
| $SO_3$ (1,350° C.) | (0.41) | (0.42) | 0.38 | 0.34 | (0.38) | (0.31) | (0.33) |
| $SO_3$ (1,500° C.) | (0.09) | 0.17 | 0.16 | 0.15 | (0.17) | (0.18) | (0.17) |
| $\Delta SO_3$ | (0.32) | (0.25) | 0.22 | 0.19 | (0.21) | (0.13) | (0.16) |
| Tg (° C.) | 620 | 645 | 648 | 630 | 649 | 644 | 648 |
| $T_2$ (° C.) | 1541 | (1512) | (1513) | 1500 | 1589 | 1554 | (1595) |
| $T_4$ (° C.) | 1125 | (1136) | (1138) | 1114 | 1220 | 1197 | (1174) |
| Devitrification temperature (° C.) | 1120 | 1100 | 1120 | 1090 | 1225 | 1140 | Not measured |
| $\alpha_{50\text{-}350}$ ($10^{-7}$/° C.) | 78 | 81 | 81 | 83 | 82 | 82 | 80 |
| Specific gravity | 2.61 | 2.76 | 2.74 | 2.76 | (2.64) | (2.69) | 2.55 |
| Fracture toughness (MPa/m$^2$) | (0.77) | (0.75) | (0.76) | (0.72) | (0.73) | (0.69) | (0.69) |
| log$\rho$ ($\Omega$cm) | (11.0) | (12.0) | (12.0) | 12.3 | (9.2) | (12.0) | (10.7) |

As is apparent from Table 1, the glasses in the Working Examples of the present invention (Examples 1 to 4) are excellent in productivity, since $T_2$ is at most 1,545° C. Further, since the devitrification temperature is lower than $T_4$, they can be formed under a stabilized condition by a float process. Further, since $\Delta SO_3$ is at least 0.17%, they are excellent in fining properties. Further, they are excellent also in chemical resistance, dielectric constant, refractive index, strain point and scratch resistance, as a PDP substrate glass. Therefore, they are suitable particularly for large-sized glass plates for display substrates or solar cell substrates of at least 2 m on a side.

INDUSTRIAL APPLICABILITY

The glass composition for substrates of the present invention is useful for FPD substrates, particularly for PDP substrates. Further, the glass composition for substrates of the present invention may be used also for solar cell substrates or magnetic disk substrates.

What is claimed is:

1. A glass composition for substrates, which is characterized by comprising, as represented by mass% based on oxides,
    from 55 to 75% of $SiO_2$,
    from 5 to 15% of $Al_2O_3$,
    from 4 to 18% of MgO,
    from 3 to 12% of CaO,
    from 4 to 18% of SrO,
    from 0 to 20% of BaO,
    from 6 to 20% of $Na_2O+K_2O$,
    from 0.5 to 6% of $ZrO_2$ and
    from 18 to 25% of MgO+CaO+SrO+BaO,
    as a glass matrix composition,
    and containing from 0.001 to 0.6% of $SO_3$, and which is further characterized in that
    when the viscosity is represented by η, the temperature satisfying logη=2 is at most 1,545° C. and the devitrification temperature is at most the temperature satisfying logη=4,
    the thermal expansion coefficient is from 75×10$^{-7}$ to 90×10$^{-7}$/° C.,
    the specific gravity is at most 2.8, and
    the glass transition point is at least 600° C.

2. The glass composition for substrates according to claim 1, which is characterized by comprising, as represented by mass % based on oxides,
    from 55 to 70% of $SiO_2$,
    from 5 to 10% of $Al_2O_3$,
    from 4 to 10% of MgO,
    from 3 to 8% of CaO,
    from 4 to 13% of SrO,
    from 0 to 11% of BaO,
    from 6 to 15% of $Na_2O+K_2O$,
    from 0.5 to 4% of $ZrO_2$ and
    from 18 to 25% of MgO+CaO+SrO+BaO,
    as a glass matrix composition,
    and containing from 0.01 to 0.4% of $SO_3$.

3. The glass composition for substrates according to claim 1, wherein the difference between
    the $SO_3$ content in a glass obtained by adding a sulfate in an amount of from 0.5 to 10 mass % as calculated as $SO_3$ to the glass matrix composition material to prepare a glass material, melting and holding the glass material at a temperature of 1,350° C. for from 30 minutes to 2 hours and then cooling it to a temperature of from 20 to 30° C. in from 30 seconds to 1 minute, and
    the $SO_3$ content in a glass obtained by melting and holding the above glass material at a temperature of 1,500° C. for from 30 minutes to 2 hours and then cooling it to a temperature of from 20 to 30° C. in from 30 seconds to 1 minute,
    is at least 0.17.

4. The glass composition for substrates according to claim 1, which has a fracture toughness of at least 0.7 MPa·m$^{1/2}$.

5. The glass composition for substrates according to claim 1, which has a volume resistivity of at least $10^{11}$ Ω·cm at 150° C.

6. The glass composition for substrates according to claim 1, wherein the temperature satisfying logη=4 is at most 1,200° C.

7. The glass composition for substrates according to claim 1, wherein the content of $K_2O$ is from 1 to 10%.

8. A process for producing a glass composition for substrates, which comprises preparing a material so as to obtain a glass comprising, as represented by mass % based on oxides, from 55 to 75% of $SiO_2$, from 5 to 15% of $Al_2O_3$, from 4 to 18% of MgO, from 3 to 12% of CaO, from 4 to 18% of SrO, from 0 to 20% of BaO, from 6 to 20% of $Na_2O+K_2O$, from 0.5 to 6% of $ZrO_2$ and from 18 to 25% of MgO+CaO+SrO+BaO, as a glass matrix composition, adding a sulfate in an amount of from 0.5 to 10 mass % as calculated as $SO_3$ to the material to prepare a glass material, melting the glass material at from 1,200 to 1,400° C., then fining it at from 1,400 to 1,700° C., and forming it into a plate glass by a float process to obtain the glass composition for substrates as defined in claim 1.

9. A process for producing a glass composition for substrates, which comprises preparing a material so as to obtain a glass comprising, as represented by mass% based on oxides, from 55 to 70% of $SiO_2$, from 5 to 10% of $Al_2O_3$, from 4 to 10% of MgO, from 3 to 8% of CaO, from 4 to 13% of SrO, from 0 to 11% of BaO, from 6 to 15% of $Na_2O+K_2O$, from 0.5 to 4% of $ZrO_2$ and from 18 to 25% of MgO+CaO+SrO+BaO, as a glass matrix composition, adding a sulfate in an amount of from 0.5 to 10 mass % as calculated as $SO_3$ to the material to prepare a glass material, melting the glass material at from 1,200 to 1,400° C., then fining it at from 1,400 to 1,700° C., and forming it into a plate glass by a float process to obtain the glass composition for substrates as defined in claim 2.

* * * * *